UNITED STATES PATENT OFFICE.

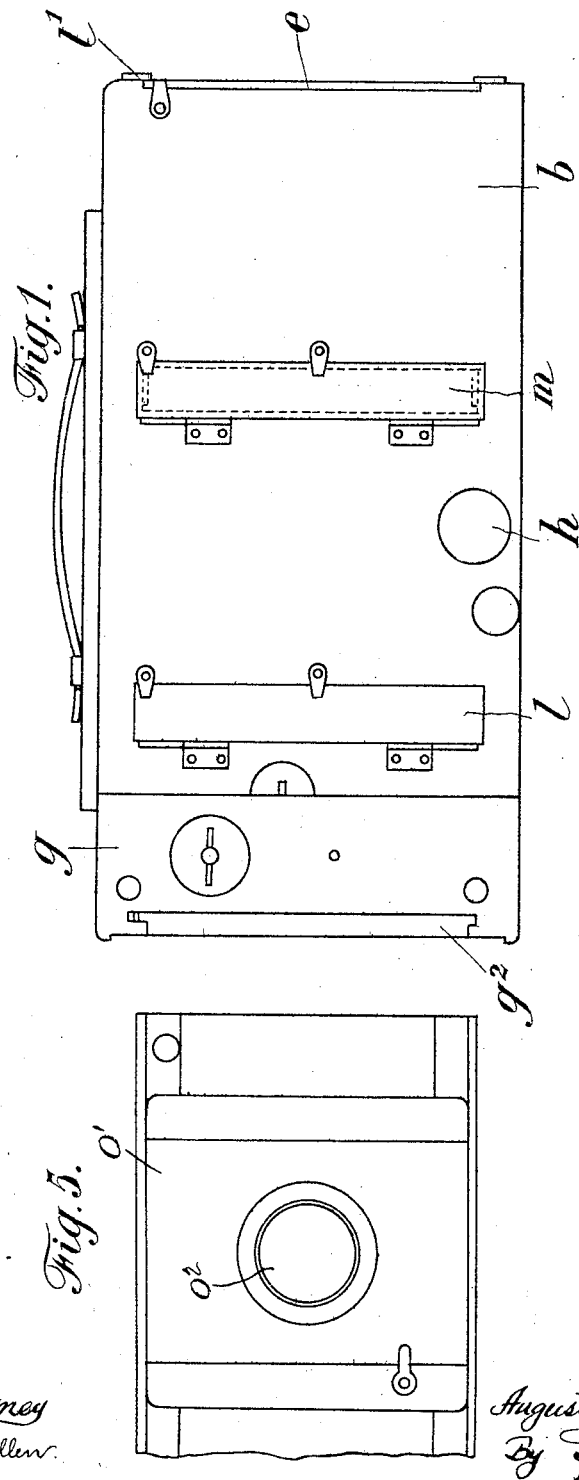

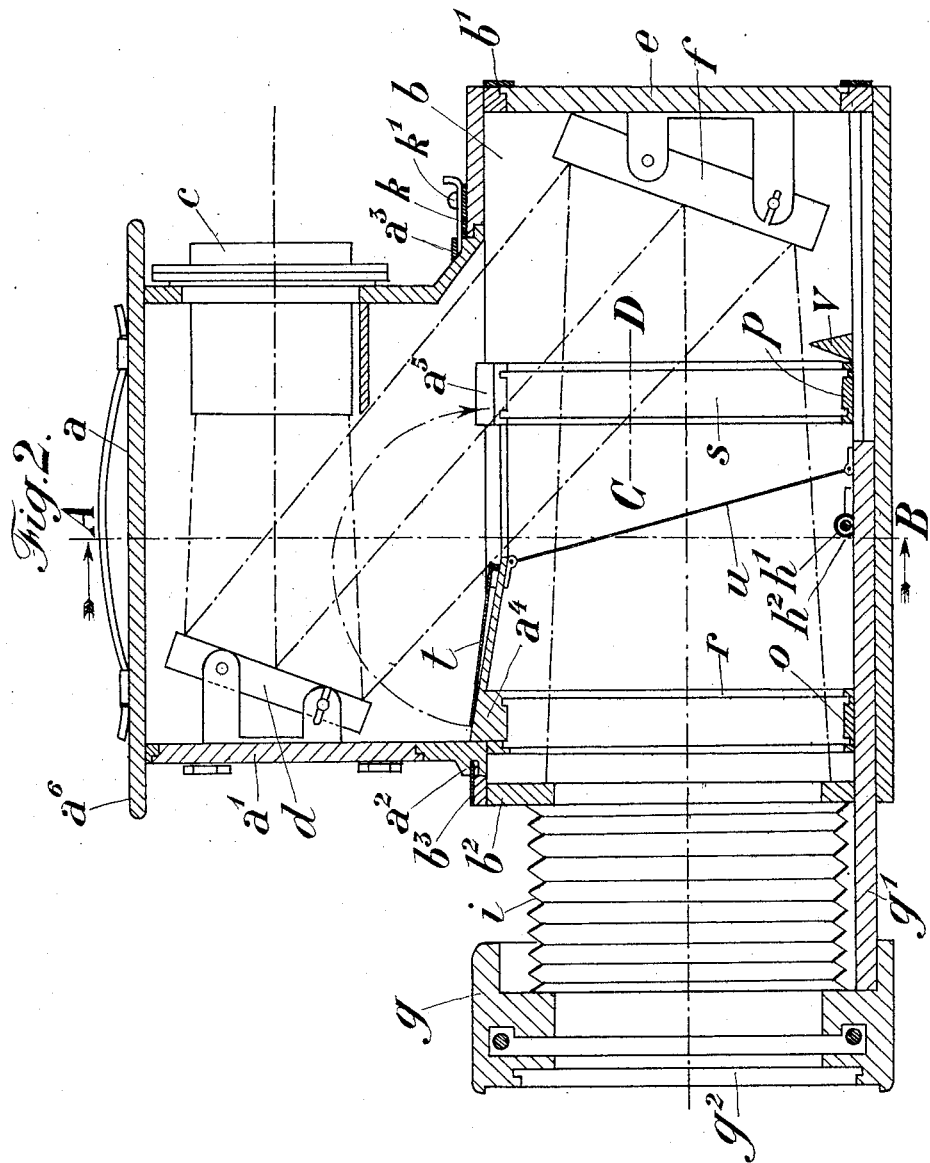

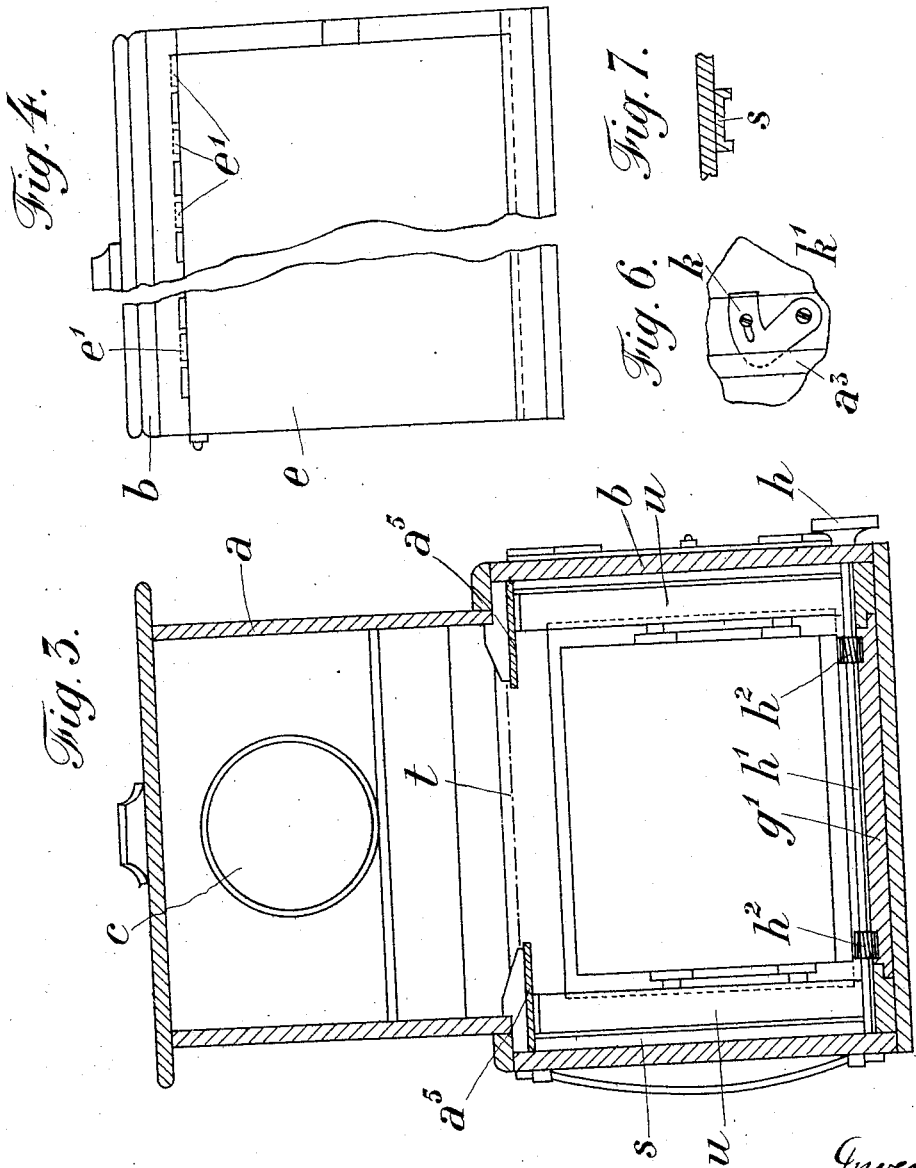

AUGUSTE VAUTIER-DUFOUR, OF GRANDSON, SWITZERLAND.

PHOTOGRAPHIC CAMERA.

1,058,501.  Specification of Letters Patent.  Patented Apr. 8, 1913.

Application filed May 7, 1912. Serial No. 695,607.

*To all whom it may concern:*

Be it known that I, AUGUSTE VAUTIER-DUFOUR, manufacturer, a citizen of Switzerland, residing at Grandson, Canton of Vaud, in the Confederation of Switzerland, have invented certain new and useful Improvements in Photographic Cameras, of which the following is a specification.

The present invention refers to photographic cameras and the object thereof is to provide such a structure that, if desired, objectives with very different focal lengths may be used with one and the same camera, and one in which objectives with relatively very great focal lengths may be used in a camera of relatively small dimensions, which is thus easily handled.

To this end, the camera made in accordance with my present invention preferably comprises a two part structure, one part or box of which is mounted on the other in an operative position whenever the apparatus is employed, and which may be placed inside the other part or box whenever the apparatus is transported or carried from place to place. The first part or box is fitted with an objective lens and a mirror arranged to reflect the light coming from the objective lens. The second part of the structure is preferably provided at one end with a removable plate or board fitted with a mirror which receives the light reflected by the mirror in the first part or box whenever said part is in its operative position. The said removable board may be replaced by another board fitted with an objective, or by a frame with ground glass, or by a plate, or film holder, or dark slide whenever it is not desired to use the mirror with which said board is fitted. At its opposite end, the second part or box of the camera is provided with a movable frame connected by a bellows to the body of the second part or box of the camera, which movable frame is adapted to receive a frame with ground glass, or a plate, or film holder, or darkslide, or a board carrying an objective or analogous parts to permit of the use of the camera in different manners. In order that a greater number of objectives of different focal lengths may be used, and to permit of the employement of the apparatus with an objective placed at the interior of the same and guarded or protected against direct light, and to employ the apparatus without a focusing cloth or cover to observe the image on the ground glass during the focusing of the objective, openings or slits are provided in one of the sides of the second part or box of the camera, and means are provided within the same, for receiving in different positions between the movable or adjustable frame and the opposite end of the second part of the camera, any of the frames with ground glass, plate or film-holder, boards with objectives or other devices which are interchangeable in their various positions in the apparatus.

In the annexed drawings, Figure 1 is a side view of the closed apparatus ready for transportation. Fig. 2 is a vertical section of the apparatus the parts of which are in their operative positions for taking photographs with an objective of great focal length. Fig. 3 is a cross section on line A—B Fig. 2. Fig. 4 is an end view of the apparatus closed as shown in Fig. 1 and as it is seen when looking from the right to the left in said figure. Figs. 5 and 6 are detail views of certain parts of the apparatus, and Fig. 7 is a section on line C—D Fig. 2.

$a$ $b$ are the two parts or boxes of the camera. The first part or box $a$, which is so constructed as to be placed inside of the second part $b$, in order to reduce the size of the camera for transportation, carries the objective lens $c$ at the front end, opposite which is placed a mirror $d$. This mirror is carried by a shutter or swinging board $a^1$ which forms the rear end of the part $a$ of the camera. At the forward end of $b$ is placed a removable board $e$, carrying a mirror $f$. The lower edge of the board $e$ is maintained in a slide formed in the forward wall of the part or box $b$, and the upper edge of the board is provided with teeth $e^1$ which normally rest against corresponding teeth on a piece $b^1$, secured to the front wall of the part $b$ of the camera. By shifting the board $e$ in the slide laterally from the right to the left, as shown in Fig. 4, the teeth $e^1$ may be brought in line with the spaces between the teeth of the piece $b^1$, and then the board may be swung forward, the teeth $e^1$ passing between the teeth $b^1$, so that the board may then be removed. At the place formerly occupied by the same, for example, a board $o'$ carrying an objective lens $o^2$, as shown in Fig. 5, may be substituted, or a frame with a ground glass for the focusing of the objective, or a plate or film-holder or dark slide or analogous devices. At the end of part $b$, opposite to that carrying the board $e$, a movable or adjustable frame $g$ is placed. This frame $g$ is supported by a board $g^1$ slidably mounted between guides placed on the bottom of the part $b$ of the camera. In the frame $g$ is formed a slide $g^2$ of the same dimensions as that receiving the board $e$ at the forward end of $b$. The frame $g$ may be adjusted to position by means of a button $h$, carried by a shaft $h^1$ having pinions $h^2$ gearing with racks carried by the board $g^1$. When the button $h$ is turned the frame $g$ will be moved near to or farther from the end wall $b^2$ of part $b$, which end wall is provided with a central opening, and is connected to the frame $g$ by a bellows $i$. Whenever the apparatus is set up, as shown in Fig. 2, and its parts are placed in their operative positions, the lower portion of the part $a$ is maintained in a corresponding opening in the upper wall of the part $b$ by a piece $b^3$, carried by the part $b$, and the forward edge of which engages a member $a^2$ provided at the rear side of the part $a$. At its front side, the part or box $a$ is secured to the part $b$ by a lock $k$, pivotally mounted at $k^1$ on the upper wall of the part $b$, and the free end of which is engaged with the underside of a plate $a^3$, carried by the part $a$.

In one of the sides of the part $b$ there are two vertical slits or openings which are normally closed by shutters $l$ and $m$. At the respective lower ends of these openings or slits, there are lower horizontal slides $o$ and $p$, placed on the interior of the part $b$. At the bottom of the part $a$ there are horizontal slides $a^4$, $a^5$, corresponding with the upper ends of the slits closed by the shutters $l$ and $m$. As is shown by Fig. 3, the slide $a^5$ consists of two sections between which there is an open space permitting the passage of light whenever photographs are taken by means of the objective lens $c$. Between the slides $o$ and $a^4$ and $p$ and $a^5$, respectively, there are fixed on the interior of the part $b$, opposite the slits closed by the shutters $l$ and $m$, vertical slides $r$ and $s$. Corresponding vertical slides are provided opposite the slides $r$ and $s$, by the inner faces of the shutters $l$ and $m$.

To close the apparatus whenever the parts of the same are in their operative positions shown at Fig. 2, the lock $k$ is opened; the forward end of the part $a$ is then swung downward, and then the whole of part $a$ may be moved toward the forward end of the part $b$ until the lower rear edge of the part $a$ is free from the piece $b^3$ and thus becomes loose. The part $a$ is then lowered in the part or box $b$ of the camera until the protruding edges $a^6$ of the part $a$ come to rest, as shown in Fig. 1, on the corresponding edges of the opening of the upper wall of the part $b$, through which the part $a$ is passed. The part $a$ is maintained in this latter position by the lock $k$, which thus engages a corresponding recess formed in the front edge $a^6$, and by the lower rear edge of the part $a$, which rests against the wall $b^2$.

Whenever photographs are to be taken with the objective lens $c$, which is one having a great focal length, the apparatus is arranged as shown in Fig. 2, and a frame with ground glass, or a plate or film-carrier, is placed in the slide $g$. The light coming from the objective lens $c$ is then successively reflected by the mirrors $d$ and $f$ before reaching the ground glass, or the plate or film. To take photographs with an objective lens of shorter focal length, the objective lens $c$ is closed by a cap of any usual and well known type, and for the board $e$ is substituted a board on which is mounted any particular objective lens with which it is desired to take the photograph. The slides formed at the forward end of the part $b$, opposite the shutters $l$ and $m$, and at $g^2$ are all of the same dimensions so that the lens board instead of being placed in the space occupied by the board $e$, as shown in the drawing, may be placed for instance in any one or the other of the intermediate slides to which access is obtained by opening one of the shutters $l$ or $m$. In this case, it is not necessary that the objective lens $c$ be closed to prevent the entrance of light in the apparatus through this lens. To prevent the light coming from the lens $c$ penetrating behind the board carrying the objective, whenever the same is placed in the slide corresponding to the shutter $m$, an interior shutter $t$ carried by the lower portion of the part $a$, may be swung forward. The board carrying the objective being thus placed in one of the intermediate positions indicated, the part of the camera situated in front of the objective constitutes a guard protecting the objective lens against being directly lighted, that is, receiving rays directly from the source of light, as in taking photographs in the face of the sun. By placing the board at different distances from the frame $g$, objectives with shorter focal lengths may be used as will be apparent.

Whenever the board carrying the objective is placed in the space occupied by $e$ on the drawing, or in the slide corresponding to the shutter $m$, the ground glass or the plate, or film holder, or dark slide may be placed in the slide corresponding to the shutter $l$, and in this case, the part of the apparatus or camera situated rearward of the ground glass prevents the access of the light from the sides on the ground glass during the focusing of the objective, so that this may be done without a focusing cloth. The dimensions of all the slides being the same makes it possible to place the board carrying the objective in the slide $g^2$ or in one or the other of the slides $r\ s$ closed by the shutters $l$ and $m$, and the frame with the ground glass, or the plate or film carrier, or dark slide in one of the said slides $r\ s$, or in the space occupied by $e$ in the drawing, as well as in the slide $g^2$.

$u$ designates black ribbons of fabric or of other material having a dead black surface, extending between the under face of the part $a$ and the bottom of the part $b$, and $v$ represents a transverse piece also having a dead black surface, intended to prevent the reflection of light by the walls of the part $b$ on the plates or films. By replacing the objective lens $c$ with an objective of shorter focal length and placing the mirrors as shown in Fig. 2, the apparatus may be employed as a camera for making enlargements of photographs, or for any other work in which a camera of great length is necessary.

Any desired means, other than those hereinbefore described, may be employed to maintain the part or box of the camera carrying the objective with great focal length and one of the mirrors in operative position on the other part of the camera when photographs are being taken, and in the said other part, whenever the apparatus is to be transported.

I claim as my invention:

1. A photographic camera comprising a frame, a front board secured to one end thereof, a bellows and holders secured at the opposite end thereof, and a plurality of slides intermediate of the front board and bellows and holders, such slides all being of the same dimensions and adapted to receive interchangeably the said front board, or holder for a device having a sensitized surface or a ground glass frame.

2. A photographic camera comprising a frame, a front board secured to one end thereof, a bellows and holder secured at the opposite end thereof, the said frame being provided in spaced positions with a plurality of openings, means for normally closing the said openings, and a plurality of slides corresponding in number with the said openings and placed adjacent thereto intermediate of the front board and bellows, the said slides being of the same dimensions and adapted to receive interchangeably the said front board or holder for a device having a sensitized surface or a ground glass frame.

3. A photographic camera comprising a frame, a front board secured to one end thereof, a bellows and holder secured at the opposite end thereof, the said frame being provided in spaced positions with a plurality of openings, shutters hinged to said frame and adapted to normally close the said openings, and a plurality of slides corresponding in number with the said openings and placed adjacent thereto intermediate of the front board and bellows, the said slides being of the same dimensions and adapted to receive interchangeably the said front board or holder for a device having a sensitized surface or a ground glass frame.

4. A photographic camera comprising a two-part frame, the second part of which is adapted to receive and contain the first part thereof, when not in use, a lens board and lens in the front end of the said first part, a mirror and mirror board at the rear end of the first part, a mirror board and mirror at the font end of the second part, and a bellows and a holder for a device having a sensitized surface at the rear of the second part, a plurality of slides in the said second part intermediate of this mirror board and mirror and its bellows, the said slides being adapted to interchangeably receive the lens and lens board, or holder for the device having a sensitized surface, or a ground glass frame, and means for securing the first part in operative position to the second part and exteriorly thereof.

5. A photographic camera comprising a two-part frame, the second part of which is adapted to receive and contain the first part thereof, when not in use, a lens board and lens in the front end of the said first part, a mirror and mirror board at the rear end of the first part, a mirror board and mirror at the front end of the second part, and a bellows and a holder for a device having a sensitized surface at the rear of the second part, a plurality of slides in the said second part intermediate of this mirror board and mirror and its bellows, the said slides being adapted to interchangeably receive the lens and lens board, or holder for the device having a sensitized surface, or a ground glass frame, said second part being provided with openings placed adjacent to the said slides, shutters for normally closing the said openings, and means for securing the first part in operative position to the second part and exteriorly thereof.

6. A photographic camera comprising a two-part frame, the second part of which is adapted to receive and contain the first part thereof, when not in use, a lens board and lens in the front end of the said first part, a mirror and mirror board at the rear end of the first part, a mirror board and mirror at the front end of the second part, and a bellows and a holder for a device having a sensitized surface at the rear of the second part, a plurality of slides in the said second part intermediate of this mirror board and mirror and its bellows, the said slides being adapted to interchangeably receive the lens and lens board, or holder for the device having a sensitized surface, or a ground glass frame, said second part being provided with openings placed adjacent to the said slides, shutters for normally closing the said openings, means for securing the first part in operative position to the second part and exteriorly thereof, there being an opening provided between the said first and second parts of the frame, when the same are placed in their operative positions, to permit of the passage of the light from the interior of the first part to that of the second part, and means for closing the said opening to shut off the passage of light when the second part of the frame only is employed.

In testimony whereof I affix my signature in presence of two witnesses.

AUGUSTE VAUTIER-DUFOUR.

Witnesses:
    Rod. de Wurtemberg,
    Louis H. Munier.

Copies of this patent may be obtained for five cents each, by addressing the "Commissioner of Patents, Washington, D. C."